United States Patent [19]
Harloff

[11] 4,279,569
[45] Jul. 21, 1981

[54] CROSS-FLOW TURBINE MACHINE

[76] Inventor: Gary J. Harloff, 579 Carnival Dr., Pittsburgh, Pa. 15239

[21] Appl. No.: 85,267

[22] Filed: Oct. 16, 1979

[51] Int. Cl.³ .............................................. F01D 1/14
[52] U.S. Cl. ........................................ 415/52; 415/148
[58] Field of Search .................... 415/52, 148, 149 R, 415/DIG. 1, 55, 56, 58

[56] References Cited
U.S. PATENT DOCUMENTS

| 3,249,292 | 5/1966 | Eck et al. | 415/148 |
| 3,325,089 | 6/1967 | Vogler | 415/DIG. 1 |
| 4,084,918 | 4/1978 | Pavlecka | 415/52 |

FOREIGN PATENT DOCUMENTS 986096  3/1965  United Kingdom ................... 415/148

Primary Examiner—Louis J. Casaregola

[57] ABSTRACT

The cross-flow turbine machine provides shaft power by extracting energy from a moving fluid. The fluid comprises both liquids and gases. Fluid is guided into the rotor by inlet guide means. The fluid then flows through the first rotor, through the interior, through the second rotor, through the exit, and through the diffuser to exit the machine at ambient pressure. Due to the change in angular momentum of the fluid across the turbine rotor, a torque is applied to the output power shaft. The output power shaft can be used, for example, to drive a water pump, an electric generator, or a compressor.

4 Claims, 2 Drawing Figures

CROSS-FLOW TURBINE MACHINE

BACKGROUND OF THE INVENTION

This invention relates to the use of kinetic energy of a moving fluid to drive a two dimensional turbine. The turbine can be of arbitrary width and hence the output shaft power can be increased by increasing the turbine width. The torque of the output shaft can be controlled by varying the position of the exit throttle.

The present invention provides the means to produce shaft power, in arbitrary quantities, by extracting kinetic energy from, for example, moving air, moving water (for example the Gulf Stream), or moving steam.

SUMMARY OF THE INVENTION

The present invention is a device for producing shaft power. The two dimensional turbine is of arbitrary width. The kinetic energy of the freestream fluid is increased at the entrance of the first rotor by the area contraction of the inlet. The inlet shape and guide vanes guide the fluid into the rotating inlet turbine vanes. Housing shapes around the rotor periphery guide the fluid through the rotating vanes. The fluid is guided through the turbine exit by the exit housing. The diffusing area housing increases the exiting flow's static pressure to the ambient pressure. The boundary layer injection slots along the entire width of the machine, between the turbine exit and the diffuser, avoids boundary layer separation in the diffuser and significantly augments the quantity of flow through the turbine machine. The flow through these slots reduce the pressure at the rotor exit much like the pressure is decreased over the top of a lifting airfoil. The exit throttle controls the shaft power by controlling the exit area and hence the flow rate. The turbine machine has a short length to rotor diameter ratio of about 2.5 for low cost and low drag, and a low exit height to diameter of about 1.7, also for low drag.

It is therefore an object of this invention to control and to convert the fluid's kinetic energy into shaft power.

It is another object to provide a turbine which can increase the shaft power by increasing the width of the machine.

It is another object to control the shaft power by controlling the exit area.

These and other objects, features, and advantages of the invention will become apparent from the following description taken in conjunction with the illustrative embodiment in the accompanying drawings in which like numerals identify like elements in the figures.

DETAILED DESCRIPTION OF THE PREFERRED EMBODIMENT

Figure 1:
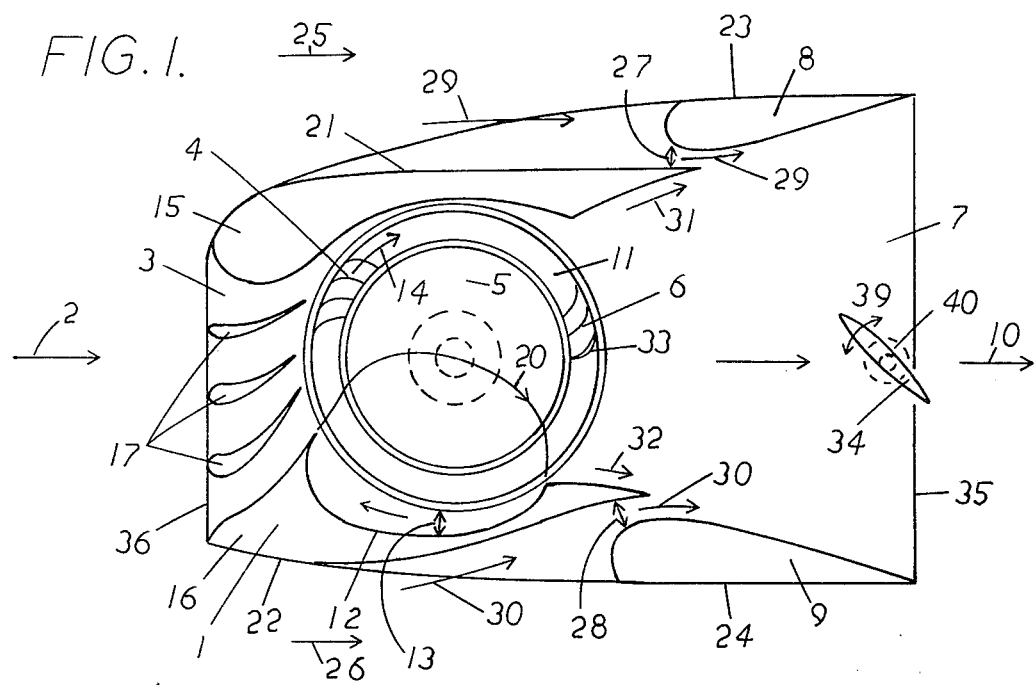
FIG. 1 is a diagram of the cross-flow turbine machine showing the relationship of the inlet, guide vanes, rotor and vanes, exit housing, diffusing section, and exit area controller.

The present invention converts kinetic energy of the moving fluid into rotational shaft power by controlling the flow angle and velocity into and out of the rotor. Referring to FIG. 1, turbine 1 is shown facing into a flow of moving fluid, as shown by arrow 2. The fluid flows through the inlet 3, through the inlet rotor vanes 4, through the interior 5, through the outlet rotor vanes 6, through the exit 7, through the exit 7, through the diffusing nozzles 8 and 9, and exiting the machine with flow velocity shown by arrow 10. The interior region 5 is free from flow restriction since the rotor shaft 19 is exterior to the flow region. The inlet 3 is bounded by guide walls 15 and 16 and entry plane 36. The guide walls 15 and 16 are shaped to permit satisfactory turbine performance (i.e. to avoiding flow separation) over a range of incoming flow angles. The inlet guide vanes 17 are arbitrary and when used 17 in cooperation with the inlet housing have a continuously decreasing flow area which causes a continuous velocity increase from the inlet station 36 of FIG. 1 to the rotor inlet station (between the inlet guide vanes and the rotor inlet). The guide vanes will also establish the flow angles and velocity, at the rotor inlet station, which may be variable around the inlet periphery. The rotor 11 rotates in the direction shown by arrow 14. The axis of rotation is perpendicular to the incoming fluid flow. The rotor 11 has associated therewith vortex forming means 12 which defines the flow gap 13 which diverges and then converges in the direction of rotation. The gap 13 will form a vortex having a recirculating stream-line shown by arrow 20. The vortex forming means controls the circumferential and radial position of the naturally ocurring vortex and stabilizes the position of the vortex over a range in flows. The radial position of the vortex is increased and this considerably increases the interior aerodynamic flow cross sectional area which directly increases the maximum flow achievable. The rotor 11 may have vanes either of the circular arc design 4 and 6 or of the aerodynamic design 33. The exterior walls 21, 22, 23, and 24 guide the exterior flow, shown by arrows 25 and 26, around the outside of the machine. A portion of the exterior flow passes through the gaps 27 and 28; the entering flow 29 and 30 energize the inside wall boundary layer flow 31 and 32. The area at exit plane 35 is controlled by a variable positioned vane 34.

Figure 2:
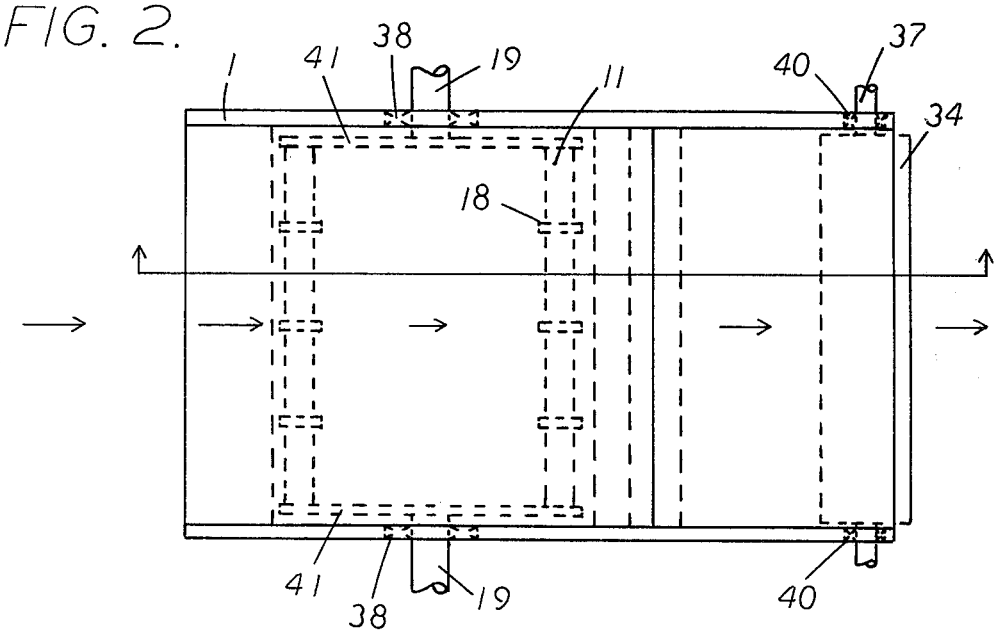
FIG. 2 is a top view of the cross-flow turbine machine.

Referring to FIG. 2 there is shown a top view of the cross-flow turbine machine 1. The rotor 11 is strengthened by support discs 18 which are positioned along the width as required. The power output shaft(s) 19 is connected to the end discs 41 and is supported by bearings 38. The variable positioned vane 34 is supported by bearings 40, and is rotated by rotating the vane shaft 37 about its center as shown by arrow 39. The exit vane 34 is a means of controlling the exit flow area which therefore controls the flow through the turbine machine. The vane can be controlled by a suitable control system which is not discussed herein. The fact that the exit area controls the flow in such devices is documented in a study by G. J. Harloff, "Cross Flow Fan Experimental Development and Finite Element Modeling," Ph.D. Dissertation, U. of Texas at Arlington 1979.

What is claimed is:

1. A cross-flow turbine machine for extracting kinetic energy from a fluid to provide for shaft power output; the machine is comprised of:
   a. a cylindrical vaned rotor with axis of rotation perpendicular to the incoming flow;
   b. inlet housing for controlling the fluid velocity vector into the inlet rotor vanes;
   c. inlet guide vanes which curve in the direction of rotor rotation for controlling the flow velocity vector into the inlet rotor vanes;

d. flow controlling means consisting of housing shapes around the rotor outer periphery, vortex forming means, exit housing, and diffusing nozzles all of which extend the width of said rotor;

e. vanes of said rotor of the circular arc or aerodynamic design;

f. adjustable vane in the exit plane to control the flow rate and hence the rotational speed of the rotor and power output.

2. A fluid flow turbine machine according to claim 1 having guide wall means associated with the said rotor and defining with said rotor forming an entry region for flow of fluid into the rotor; the guide wall means associated with said rotor forming an exit region for flow out of said rotor; the guide wall means forming the vortex; and the guide wall means forming a diffusor.

3. A fluid flow turbine machine according to claim 1 wherein said rotor outlet housing and diffusor are spaced to form a gap whereby additional exterior fluid is induced to flow through said gap by the fluid passing through said machine.

4. A fluid flow machine according to claim 1 wherein the exterior guide walls are shaped to provide low resistance to the exterior fluid flow.

* * * * *